United States Patent [19]
Delzer et al.

[11] Patent Number: 5,268,152
[45] Date of Patent: Dec. 7, 1993

[54] SULFUR ABSORBENTS AND PROCESS FOR REMOVING SULFUR FROM FLUID STREAMS

[75] Inventors: Gary A. Delzer; Ted H. Cymbaluk; Dennis R. Kidd; Gerhard P. Nowack, all of Bartlesville, Okla.

[73] Assignee: Phillips Petroleum Company, Bartlesville, Okla.

[21] Appl. No.: 984,135

[22] Filed: Dec. 1, 1992

Related U.S. Application Data

[62] Division of Ser. No. 665,832, Mar. 7, 1991, Pat. No. 5,174,919.

[51] Int. Cl.$^5$ ............................................. C01B 17/16
[52] U.S. Cl. ..................................... 423/210; 423/220; 423/230; 423/242.1; 423/244.02; 423/573.1; 95/136
[58] Field of Search ............ 423/210, 220, 230, 242.1, 423/244.02, 573.1; 55/73; 502/208

[56] References Cited

U.S. PATENT DOCUMENTS

| | | | |
|---|---|---|---|
| 3,334,469 | 8/1967 | Deicher et al. | 55/73 |
| 3,880,620 | 4/1975 | Lange | 55/72 |
| 4,330,522 | 5/1982 | Lieder | 423/573 G |
| 4,861,566 | 8/1989 | Denny | 423/230 |
| 4,946,660 | 8/1990 | Denny et al. | 423/230 |
| 5,135,904 | 8/1992 | Kamiya et al. | 502/402 |

FOREIGN PATENT DOCUMENTS 313335  10/1971  U.S.S.R. .................... 55/73

*Primary Examiner*—Gary P. Straub
*Assistant Examiner*—Timothy C. Vanoy
*Attorney, Agent, or Firm*—Charles W. Stewart

[57] ABSTRACT

A novel composition comprising zinc oxide and at least one metal phosphate that can be effectively used to remove sulfur compounds from a fluid stream by contacting said fluid stream under suitable absorption conditions with this novel composition. Also, a novel method is described for making a composition comprising mixing with zinc oxide at least one metal phosphate followed by the addition of a dilute acid to form a paste or paste like material having a desired consistency for agglomeration.

17 Claims, No Drawings

SULFUR ABSORBENTS AND PROCESS FOR REMOVING SULFUR FROM FLUID STREAMS

This application is a divisional of application Ser. No. 07/665,832, filed Mar. 7, 1991, now allowed as U.S. Pat. No. 5,174,919.

BACKGROUND OF THE INVENTION

This invention relates to a process for removing sulfur or sulfur compounds from fluid streams. In another aspect, this invention relates to a composition suitable for use in such process. In yet another aspect, this invention relates to a method for making a composition and the composition thereof suitable for use in a process for removing sulfur compounds from fluid streams.

The removal of sulfur from fluid steams can be desirable or necessary for a variety of reasons. If the fluid stream is to be released as a waste stream, removal of sulfur from the fluid stream can be necessary to meet any sulfur emission requirements that may be set by various air pollution control authorities. Such sulfur emission requirements are generally in the range of from about 10 ppm to about 500 ppm of sulfur in the fluid stream. If the fluid stream is to be burned as a fuel, removal of sulfur from the fluid stream can be necessary to prevent environmental pollution. If the fluid stream is to be processed, removal of the sulfur is often necessary to prevent the poisoning of sulfur sensitive catalyst or to satisfy other process requirements.

Various absorption compositions have been used to remove sulfur from fluid streams when the sulfur is present as hydrogen sulfide ($H_2S$). Of those materials proposed as a sulfur absorbents, many do not have the desirable properties necessary for being effective, commercially viable absorbing materials. In order for an absorbent composition to be commercially useable, it must have a high sulfur-absorption capacity and it must be capable of efficiently removing significant amounts of sulfur from fluid streams contaminated with sulfur or sulfur compounds. It has been found that many of these absorbing compositions effectively oxidize significant amounts of hydrogen sulfide to sulfur dioxide with the resulting sulfur dioxide thereafter passing unabsorbed through the contact material along with the effluent fluid stream. This phenomenon is sometimes called sulfur slippage. It is desirable to have an absorption material that not only has a high capacity to absorb sulfur from a fluid stream, but also, minimizes the amount of sulfur slippage.

SUMMARY OF THE INVENTION

It is thus an object of the invention to provide a process for removing sulfur or sulfur compounds from sulfur contaminated fluid streams while simultaneously minimizing the amount of sulfur slippage.

Accordingly, it has been found that the novel composition comprising zinc oxide and at least one metal phosphate can be effectively used to remove sulfur compounds from a fluid stream by contacting said fluid stream under suitable absorption conditions with this novel composition. Also, there is a novel method of making a composition comprising mixing with zinc oxide at least one metal phosphate followed by the addition of a dilute acid to form a paste or paste like material having a desired consistency for agglomeration.

Other objects, advantages and features of this invention will become apparent from a study of this disclosure and the appended claims.

DETAILED DESCRIPTION OF THE INVENTION

The composition of matter of this invention, which is used as an absorbent for removing sulfur compounds from a fluid stream, is a novel composition comprising zinc oxide and at least one metal phosphate compound. In another embodiment of the invention, the composition of matter comprises zinc oxide and a coprecipitate of two or more metal phosphate compounds. As used herein, the term phosphate includes orthophosphates, pyrophosphates, metaphosphates and polyphosphates. The metal phosphate compounds generally consist of a phosphate and either a monatomic metal cation or a polyatomic metal cation. The metal component of the metal phosphate compounds can include Group IIA metals, Group IIIA metals, Group IVB metals, and Group VIII metals. As used herein, the Group IIA metals comprise the alkaline earth metals of beryllium, magnesium, calcium, strontium, and barium; the Group IIIA metals comprise aluminum, gallium, indium, and thallium; the Group IVB metals comprise titanium, zirconium and hafnium; and the Group VIII metals comprise iron, cobalt, nickel, ruthenium, rhodium, palladium, osmium, iridium and platinum. The metal phosphate compounds described herein can be represented stoichiometrically by the formula, $M_{n+2}P_nO_{3n+1}$, wherein M is a metal atom, P is phosphorous, O is oxygen, and n is an integer number of one or greater.

Any suitable metal phosphate can be used in a composition of matter of this invention provided it gives the desirable properties of minimizing the amount of sulfur slippage that occurs in the absorption process and provides for high sulfur absorption capacity. Preferably, however, the at least one metal phosphate is selected from the group consisting of Group IIA phosphates, Group IVB phosphates, Group IIIA phosphates and Group VIII phosphates. Most preferably, the at least one metal phosphate is selected from the group consisting of titanium phosphate, magnesium phosphate and aluminum phosphate. As for the composition comprising a coprecipitate of two or more metal phosphate compounds, the metal phosphate compounds that form the coprecipitate can be any suitable metal phosphate which gives the desired absorbent composition properties. Preferably, the coprecipitate will comprise a Group IVB phosphate and a metal phosphate selected from the group consisting of Group IIA phosphates and Group VIII phosphates. Most preferably, the coprecipitate is of a metal phosphate selected from the group consisting of titanium phosphates and zirconium phosphates and a metal phosphate selected from the group consisting of nickel phosphates and aluminum phosphates.

The composition of matter of this invention can he prepared by any suitable method which will give an absorption composition suitable for use in the contacting of sulfur containing fluids. One preferred method for preparing the absorption composition is to combine zinc oxide and at least one metal phosphate in any suitable mixing device capable of achieving the desired degree of mixing. These components can be mixed in a batch-wise fashion or a continuous fashion provided that the components are thoroughly and intimately mixed prior to further processing. Suitable types of batch mixers include, but are not limited to, change-can mixer, stationary-tank mixers, double-arm kneading mixers having any suitable type of agitator or blades such as sigma blades, dispersion blades, multi-wiping overlap blades, single curb blades, double-nabin blades and the like. Suitable types of continuous mixers can include, but are not limited to, single or double screw extruders, trough-and-screw mixers and pugmils. To achieve the desired dispersion of the absorption material components, the materials are mixed until a homogenous mixture is formed. The mixing time should be sufficient to give a uniform mixture and, generally, will be less than about 45 minutes. Preferably, the mixing time will be in the range from about 2 minutes to about 15 minutes.

Following the mixing of the components, a dilute acid can be added to the mixture to form a paste of a desired consistency. The dilute acid can be added to the mixture by any suitable method capable of providing a paste having suitable properties for agglomeration. Preferably, however, the dilute acid is added to the mixture by spraying it within the mixture during continued mixing. Any suitable acid can be used in the preparation of the absorbing composition. Examples of such suitable acids include nitric acid, acetic acid, sulfuric acid, and hydrochloric acid. Nitric acid is the preferred acid. The acid concentration of the dilute acid employed in the preparation of the absorbing composition will generally be in the range of from about 1.0 weight percent to about 15 weight percent, and will preferably be in the range from about 1.0 weight percent to about 5.0 weight percent. The weight percent of the acid is expressed in terms of the weight of the concentrated acid as a fraction of the total weight of the dilute acid multiplied by the factor one hundred.

Following the addition of the acid to the mixture, the paste material formed by such addition of acid undergoes an agglomeration step. The agglomeration step is utilized to enlarge the, size of the absorption material particles and to form them into relatively permanent masses having certain desirable forms such as spheroids, pills or tablets, cylinders, irregular extrusions or merely loosely bound aggregates or clusters. Any suitable method of agglomeration known in the art can be used. Examples of such methods include, but are not limited to, molding, tabletting, pressing, pelletizing, extruding, and tumbling. The preferred method, however, is by extrusion. Various types of extrusion methods and extrusion equipment can be used. It is preferred to use either a single screw extruder or a double screw extruder that uses a screw or auger to convey or force the paste through a die plate to produce the desirable shapes or extrusion profiles.

After the paste is agglomerated, the resulting agglomerate is then dried, preferably at a temperature generally in the range of from about 75° C. to about 300° C., and more preferably in the range of from about 90° C. to about 250° C., for a period of time generally in the range of from about 0.5 hour to about 4 hours and, more preferably, in the range of from about 1 hour to about 3 hours. The dried, extruded material is then calcined in the presence of oxygen at a temperature suitable for achieving the desired degree of calcination, for example generally in the range of from about 375° C. to about 750° C. and, more preferably, in the range of from about 500° C. to about 700° C. The calcination step is conducted for a period of time suitable for achieving the desired degree of calcination, for example, generally in the range of from about 0.5 hour to about 4 hours and, more preferably, in the range of from about 1 hour to about 3 hours to produce the absorbing composition.

The zinc oxide used in the preparation of the absorbing composition can be either in the form of zinc oxide, or in the form of one or more zinc compounds that are convertible to zinc oxide under the conditions of preparation described herein. Examples of such zinc compounds include zinc sulfide, zinc sulfate, zinc hydroxide, zinc carbonate, zinc acetate, and zinc nitrate. Preferably, the zinc oxide is in the form of powdered zinc oxide.

The metal phosphates used in the preparation of the absorbing composition can be in any suitable form. Generally, and in a preferred embodiment, the metal phosphate can be formed by the precipitation of a metal phosphate from a mixture of two electrolyte solutions comprising a phosphate solution and a metal solution. Aqueous solutions of phosphates such as $(NH_4)H_2PO_4$, $(NH_4)_2HPO$, $(NH_4)_3PO_4$, $(NH_4)_4P_2O_7$, corresponding phosphates and pyrophosphates of lithium, sodium, potassium, cesium, $H_3PO_4$ and $H_3PO_3$ can be used as one of the electrolyte solutions in the precipitation of the absorbent material. Solutions of phosphonic acids such as phenyl phosphonic acids and the metal and ammonium salts of phosphonic acids may also be used to derive phosphates for the absorption composition if desired. Presently preferred is the use of an aqueous solution of ammonium phosphate dibasic.

Suitable metal compounds that can be utilized in any suitable electrolyte solution for use in the precipitation of the metal phosphate of the absorption composition of this invention include $NiCl_2$, $NiBr_2$, $Ni(NO_3)_2$, $Ni(HSO_4)_2$, $NiSO_4$, nickel(II) acetate or other nickel(II) carboxylates and the like; $TiCl_4$, $TiOCl_2$, $TiO(NO_3)_2$, $TiOSO_4$, Ti(IV) carboxylates, $Ti(OR)_4$ wherein R is an alkyl group having 1–6 C atoms per molecule, and the like; $Al(NO_3)_3$, $AlCl_3$, $Al_2(SO_4)_3$, and the like; $Mg(NO_3)_2$, Mg acetate, $MgCl_2$, and the like; $ZrCl_4$, $Zr(NO_3)_4$, $Zr(SO_4)_2$, $ZrOCl_2$, $ZrO(NO_3)_2$ and the like.

In a preferred embodiment of this invention, the absorption composition comprises zinc oxide and a coprecipitate of two or more metal phosphates. In the coprecipitation of the two or more metal phosphates, a solution containing any suitable mixture of two or more metal compounds is mixed with any suitable phosphate solution. Any suitable solvent such as water or alcohol can be used to form the solution of metal compounds and phosphate compounds, provided, however, that the metal compounds and phosphates are soluble in the solvent.

To form the coprecipitate of two or more metal phosphates, a solution of two or more metal compounds is mixed with a solution of a phosphate compound. The pH of the mixture of the two solutions is controlled so that precipitation will occur. Generally, if the phosphate solution is derived from ammonium phosphate, no additional material will be required to be added to the mixture of solutions for the control of pH; however, if other types of phosphate solutions are used, it may be necessary to add a base such as ammonia to achieve a pH that will result in the desired precipitation. The coprecipitate formed is separated from the solution from which it is formed, washed, dried and calcined as hereinabove described.

As used herein, the terms "absorbent", "absorbent composition", "absorbent compounds", "absorbent material", "absorbent mixture", "absorption", "absorption process", "absorption composition" and the like are utilized in a generic sense in referring to the mass transfer mechanisms and the mass transfer features described in this specification which can include, but are not limited to, absorption, chemi-absorption, adsorption and combinations thereof. Because it is uncertain as to the precise physical or chemical, or both, mechanisms which occur when employing the inventive compositions and processes described herein, the above listed terms, or any terms in similar form, are used for the sake of convenience and are not intended to limit in any way the present invention.

The absorption process is preferably carried out in cycles comprising an absorption period and a period for the regeneration of the sulfided absorbing composition. The absorption process comprises contacting a gaseous stream which contains hydrogen sulfide with the absorbing composition to thereby remove hydrogen sulfide from the gaseous stream. The absorbing composition becomes sulfided during the absorption period. When the absorbing composition becomes sulfided to the point that regeneration is desirable, preferably when it is nearly completely sulfided, an oxygen-containing gas is passed in contact with the absorbing composition to regenerate the absorbing composition and to convert the absorbed sulfur to a sulfur oxide.

The chemical changes that are believed to occur in the absorbing composition during this cyclic process are summarized in the following equations:

$$ZnO + H_2S \rightarrow ZnS + H_2O \quad (I)$$

$$ZnS + Oxygen \rightarrow ZnO + So_x \quad (II)$$

The absorbing composition of the present invention can be utilized to remove hydrogen sulfide from any suitable gaseous stream. The hydrogen sulfide may, for example, be produced by the hydrodesulfurization of organic sulfur compounds or may be originally present in the gaseous stream as hydrogen sulfide. Examples of such suitable gaseous streams include hydrogen sulfide-contaminated light hydrocarbons such as methane, ethane and natural gas; gases derived from petroleum products and products from extraction and/or liquefication of coal and lignite; gases derived from tar sands and shale oil; coal-derived synthesis gas; gases such as hydrogen and nitrogen; gaseous oxides of carbon; steam and the inert gases such as helium and argon. Gases that adversely affect the removal of hydrogen sulfide and which should be absent from the gaseous streams being processed are oxidizing agents, examples of which include air, molecular oxygen, the halogens, and the oxides of nitrogen.

The absorbing composition of the present invention can also be utilized to remove hydrogen sulfide from hydrogen sulfide-contaminated olefins such as ethylene. This process, however, should be carried out in the absence of free hydrogen to avoid hydrogenation of the olefins. Olefin streams should not be hydrodesulfurized as this may result in undesirable hydrogenation of at least a portion of the olefins to paraffins.

The sulfur removal processes of the present invention can be carried out by means of any apparatus whereby there is achieved an alternate contact of the absorbing composition with the sulfur-containing gaseous feed stream and, thereafter, of the absorbing composition with an oxygen-containing gas which is utilized to regenerate the absorbing composition. The sulfur removal process is in no way limited to the use of a particular apparatus. The sulfur removal process of this invention can be carried out using a fixed bed of absorbing composition, a fluidized bed of absorbing composition, or a moving bed of absorbing composition. Presently preferred is a fixed bed of absorbing composition.

In order to avoid any casual mixing of the gaseous feed stream containing hydrogen sulfide with the oxygen-containing gas utilized in the regeneration step, provision is preferably made for terminating the flow of the gaseous feed stream to the reactor and subsequently injecting an inert purging fluid such as nitrogen, carbon dioxide or steam. Any suitable purge time can be utilized but the purge should be continued until all hydrocarbon and/or hydrogen sulfide are removed. Any suitable flow rate of the purge fluid can be utilized. A presently preferred purge fluid flow late is one which will give a gaseous hourly space velocity (GHSV) in the range of from about 800 GHSV to about 1200 GHSV. As used herein, the term "gaseous hourly space velocity" is defined as the ratio of the gaseous volumetric flow rate at standard conditions of 60° F. and one atmosphere of pressure to the reactor volume.

Any suitable temperature for the sulfur-removal processes of the present invention can be utilized which will achieve the desired removal of sulfur from a gaseous feed stream. The temperature will generally be in the range of from about 150° C. to about 600° C. and will more preferably be in the range of from about 200° C. to about 450° C.

Any suitable temperature can be utilized which will regenerate the absorbing composition from its sulfided form back to the original absorbing composition form. The regeneration temperature will generally be in the range of from about 370° C. to about 815° C. The regeneration temperature is preferably in the range of from about 425° C. to about 750° C. Most preferably, the regeneration temperature should range from about 425° C. to about 600° C.

Any suitable pressure can be utilized for the processes of the present invention. The pressure of the gaseous feed stream being treated is not believed to have an important effect on the absorption process of the present invention, and will generally be in the range of from about atmospheric to about 2,000 psig during the treatment.

Any suitable residence time for the sulfur-containing gaseous feed stream in the presence of the absorbing composition of the present invention can be utilized. The residence time expressed as volumes of gas at standard temperature and pressure per volume of absorbing composition per hour will generally be in the range of about 10 to about 10,000 and will more preferably be in the range of about 250 to about 2500.

When the absorbing composition is completely sulfided it will no longer combine with the hydrogen sulfide in the manner set forth in equation (I). When this condition occurs, hydrogen sulfide will begin to appear in the effluent flowing from the reaction and this will be an indication that the absorbing composition should preferably be regenerated. The time required for the absorbing composition to become completely sulfided will generally be a function of the concentration of sulfur in the feedstock and feed rate employed.

When the absorbing composition becomes substantially completely sulfided, the absorbing composition is typically regenerated by terminating the flow of feed to the reactor and purging with an inert fluid such as nitrogen to remove any combustibles. A free oxygen-containing gas is then introduced to the reactor for the purpose of oxidizing the zinc sulfide in accordance with equation (II). The amount of oxygen supplied to the reactor during the regeneration step will generally be that which is sufficient to at least substantially remove sulfur from the absorbing composition. The regeneration step is generally conducted at about atmospheric pressure.

The following examples are presented in further illustration of the invention.

EXAMPLE I

This example illustrates the various procedures and method for the preparation of the absorption materials of this invention that were employed as absorbents in the process of Example II.

Composition A was a mixture of zinc oxide and titanium phosphate that was prepared as follows. 80 grams of zinc oxide was mixed with 20 grams of titanium phosphate to form the absorption composition. To prepare the titanium phosphate, 146.0 grams of titanium (IV) butoxide was dissolved in a solution of 100 milliliters of concentrated sulfuric acid and 600 milliliters of water to form a solution. A second solution of ammonium phosphate was prepared by mixing 56.7 grams of ammonium phosphate dibasic into 200 milliliters of water. The two solutions were thoroughly mixed together and allowed to sit for a time period of about 24 hours. The resultant precipitate was removed by filtration from the solution and washed five times with water and three times with isopropyl alcohol. The washed filter cake (titanium phosphate) was dried in air for about 24 hours followed by further drying in a forced air oven at a temperature of 200° F. for about two days. After the filter cake was dried, it was calcined in air at a temperature of 500° C. for about five hours. The combined zinc oxide and titanium phosphate was dry mixed for about 3 minutes prior to being mulled in 36.47 grams of solution, comprising 118.44 parts by weight water and 1.48 parts by weight concentrated nitric acid, to form a paste having the desired consistency. The paste was extruded and subsequently air dried overnight followed by an additional drying step at 110° C. for a period of about 3 hours to give a final absorption composition having 80 parts by weight zinc oxide and 20 parts by weight titanium phosphate. A 25 gram portion of the extrudate described above was impregnated with a nickel nitrate solution consisting of 7.43 grams of nickel nitrate hexahydrate dissolved in 6.97 grams of water. After the impregnation of the extrudate, the material was dried under a heat lamp for 1 hour followed by oven drying at a temperature of 110° C. for 3 hours. The oven dried, impregnated extrudate was then calcined for 3 hours at 500° C. to give the final impregnated absorption material having approximately 6 parts by weight nickel, 80 parts by weight zinc oxide, and 20 parts by weight titanium phosphate.

Composition B was a mixture of zinc oxide and aluminum phosphate that was prepared as follows. 80 grams of zinc oxide was mixed with 20 grams of aluminum phosphate to form the absorption composition. To prepare the aluminum phosphate, 256.4 grams of aluminum nitrate hydrate was dissolved in 600 milliliters of water to form a solution. A second solution of ammonium phosphate was prepared by mixing 80.9 grams of ammonium phosphate dibasic in 300 milliliters of water. The two solutions were thoroughly mixed together and 200 milliliters of aqueous ammonia solution comprising one part concentrated ammonia and one part water was added to the mixture to adjust the pH into the range of from 6 to 7. Sufficient water was added in order to permit stirring the gel formed for a period of 20 minutes. The resultant precipitate was removed by filtration from the solution and washed five times with water and three times with isopropyl alcohol. The washed filter cake (aluminum phosphate) was dried in air for about 24 hours followed by further drying in a forced air oven at a temperature of 200° F. for about two days. After the filter cake was dried, it was calcined in air at a temperature of 500° C. for about 2.5 hours. The combined zinc oxide and aluminum phosphate was dry mixed for about 3 minutes prior to being mulled in 47.0 grams of a solution, comprising 118.44 parts by weight water and 1.48 parts by weight concentrated nitric acid, to form a paste having the desired consistency. The paste was extruded and subsequently air dried overnight followed by an additional drying step at 110° C. for a period of abut 3 hours to give a final absorption composition having 80 parts by weight zinc oxide and 20 parts by weight aluminum phosphate. A 20 gram portion of the extrudate was impregnated with a nickel nitrate solution consisting of 5.94 grams of nickel nitrate hexahydrate dissolved in 3.41 grams water. After the impregnation of the extrudate, the material was dried under a heat lamp for 1 hour followed by oven drying at a temperature of 110° C. for 3 hours. The oven dried, impregnated extrudate was then calcined for 3 hours at 500° C. to give the final impregnated absorption material having approximately 6 parts by weight nickel, 80 parts by weight zinc oxide and 20 parts by weight aluminum phosphate.

Composition C was a mixture of zinc oxide and magnesium phosphate that was prepared as follows. 80 grams of zinc oxide was mixed with 20 grams of magnesium phosphate to form the absorption composition. To prepare the magnesium phosphate, 100 grams of magnesium nitrate hydrate was dissolved in 350 milliliters of water to form a solution. A second solution of ammonium phosphate was prepared by mixing 28.0 grams of ammonium phosphate dibasic in 100 milliliters of water. The two solutions were thoroughly mixed together and 100 milliliters of aqueous ammonia solution comprising one part concentrated ammonia and one part water was added to the mixture to adjust the pH to about 6.5. Sufficient water was added in order to permit stirring of the gel formed. The solution was stirred for about 24 hours. The resultant precipitate was removed by filtration from the solution and washed five times with water and three times with isopropyl alcohol. The washed filter cake (magnesium phosphate) was dried in air for about 24 hours followed by further drying in a forced air oven at a temperature of 200° F. for about two days. After the filter cake was dried, it was calcined in air at a temperature of 500° C. for about 2.5 hours. The combined zinc oxide and magnesium phosphate was dry mixed for about 3 minutes prior to being mulled in 27.97 grams of a solution, comprising 118.44 parts by weight water and 1.48 parts by weight concentrated nitric acid, to form a paste having the desired consistency. The paste was extruded and subsequently air dried overnight followed by an additional drying step at 110° C. for a period of abut 3 hours to give a final absorption composition having 80 parts by weight zinc oxide and 20 parts by weight magnesium phosphate. A 25 gram portion of the extrudate was impregnated with a nickel nitrate solution consisting of 7.43 gram of nickel nitrate hexahydrate dissolved in 6.02 grams water. After the impregnation of the extrudate, the material was dried under a heat lamp for 1 hour followed by oven drying at a temperature of 110° C. for 3 hours. The oven dried, impregnated extrudate was then calcined for 3 hours at 500° C. to give the final impregnated absorption material having approximately 6 parts by weight nickel, 80 parts by weight zinc oxide and 20 parts by weight magnesium phosphate.

Composition D was a mixture of zinc oxide and a coprecipitate of titanium-aluminum phosphate that was prepared as follows. 80 grams of zinc oxide was mixed with 20 grams of titanium-aluminum phosphate to form the absorption composition. To prepare the titanium-aluminum phosphate, 200 grams of aluminum nitrate hydroxide was dissolved in 300 milliliters of water to form a solution. A second solution of 57.6 grams titanium (IV) isopropoxide dissolved in 100 milliliters of concentrated nitric acid and 600 ml of water was prepared. A third solution of ammonium phosphate was prepared by mixing 63.2 grams of ammonium phosphate dibasic into 200 milliliters of water. The three solutions were thoroughly mixed together followed by the addition of 400 milliliter of aqueous ammonia solution comprising one part concentrated ammonia and one part water to adjust the pH of the solution to about 7. Sufficient water was added to permit stirring of the gel formed. The solution was stirred for 30 minutes. The resultant precipitate was removed by filtration from the solution and washed five times with water and three times with isopropyl alcohol. The washed filter cake (titanium-aluminum phosphate) was dried in air for about 24 hours followed by further drying in a forced air oven at a temperature of 200° F. for about two days. After the filter cake was dried, it was calcined in air at a temperature of 500° C. for about 2.5 hours. The combined zinc oxide and titanium-aluminum phosphate was dry mixed for about 3 minutes prior to being mulled in 35.31 grams of a solution, comprising 118.44 parts by weight water and 1.48 parts by weight concentrated nitric acid, to form a paste having the desired consistency. The paste was extruded and subsequently air dried overnight followed by an additional drying step at 110° C. for a period of about 3 hours to give a final absorption composition having 80 parts by weight zinc oxide and 20 parts by weight titanium-aluminum phosphate.

Composition E was a mixture of zinc oxide and a coprecipitate of zirconium-aluminum phosphate that was prepared as follows. 80 grams of zinc oxide was mixed with 20 grams of zirconium-aluminum phosphate to form the absorption composition. To prepare the zirconium-aluminum phosphate, 200 grams of aluminum nitrate hydroxide was dissolved in 300 milliliters of water to form a solution. A second solution of 8.25 grams zirconyl nitrate dissolved in 50 milliliters of water was prepared. A third solution of ammonium phosphate was prepared by mixing 63 grams of ammonium phosphate dibasic into 150 milliliters of water. The three solutions were thoroughly mixed together followed by the addition of 100 milliliters of aqueous ammonia solution comprising one part concentrated ammonia and one part water to adjust the pH of the solution to about 6.5. Sufficient water was added to permit stirring of the gel formed. The solution was stirred for 30 minutes. The resultant precipitate was removed by filtration from the solution and washed five times with water and three times with isopropyl alcohol. The washed filter cake (zirconium-aluminum phosphate) was dried in air for about 24 hours followed by further drying in a forced air oven at a temperature of 200° F. for about two days. After the filter cake was dried, it was calcined in air at a temperature of 500° C. for about 2.5 hours. The combined zinc oxide and zirconium-aluminum phosphate was dry mixed for about 3 minutes prior to being mulled in 35.48 grams of a solution, comprising 118.44 parts by weight water and 1.48 parts by weight concentrated nitric acid, to form a paste having the desired consistency. The paste was extruded and subsequently air dried overnight followed by an additional drying step at 110° C. for a period of about 3 hours to give a final absorption composition having 80 parts by weight zinc oxide and 20 parts by weight zirconium-aluminum phosphate.

Composition F was a mixture of zinc oxide and a coprecipitate of nickel-titanium phosphate that was prepared as follows. 66 grams of zinc oxide was mixed with 34 grams of nickel-titanium phosphate to form the absorption composition. To prepare the nickel-titanium phosphate, 229.8 grams of nickel nitrate hydrate was dissolved in 300 milliliters of water to form a solution. A second solution of 267.6 grams titanium (IV) butoxide dissolved in 180 milliliters of concentrated sulfuric acid and 1100 milliliters of water was prepared. A third solution of ammonium phosphate was prepared by mixing 308.2 grams of ammonium phosphate dibasic into 300 milliliters of water. The three solutions were thoroughly mixed together followed by the addition of 400 milliliters of aqueous ammonia solution comprising one part concentrated ammonia and one part water to adjust the pH of the solution to about 7. Sufficient water was added to permit stirring of the gel formed. The solution was stirred for 30 minutes. The resultant precipitate was removed by filtration from the solution and washed five times with water and three times with isopropyl alcohol. The washed filter cake (nickel-titanium phosphate) was dried in air for about 24 hours followed by further drying in a forced air oven at a temperature of 200° F. for about two days. After the filter cake was dried, it was calcined in air at a temperature of 500° C. for about 2.5 hours. The combined zinc oxide and nickel-titanium phosphate was dry mixed for about 3 minutes prior to being mulled in 30.78 grams of a solution, comprising 118.44 parts by weight water and 1.48 parts by weight concentrated nitric acid, to form a paste having the desired consistency. The paste was extruded and subsequently air dried overnight followed by an additional drying step at 110° C. for a period of about 3 hours to give a final absorption composition having 80 parts by weight zinc oxide and 20 parts by weight nickel-titanium phosphate.

Composition G was a mixture of zinc oxide and a coprecipitate of zirconium-nickel phosphate that was prepared as follows. 10 grams of zinc oxide was mixed with 10 grams of zirconium-nickel phosphate to form the absorption composition. To prepare the zirconium-nickel phosphate, 60 grams of nickel nitrate hexahydrate and 81.1 grams of zirconyl chloride tetrahydrate were dissolved in 1.5 liters of water. A second solution of ammonium phosphate was prepared by mixing 97 grams of ammonium phosphate dibasic in 600 milliliters of hot water. The two solutions were mixed and stirred for a period of 1 hour on a hot plate. The resultant precipitate was removed by filtration from the solution and washed with 1.5 liters of hot water. The washed filter cake (zirconium-nickel phosphate) was oven dried for a period of about 24 hours followed by calcination in air at a temperature of 560° C. for about 4 hours. The combined zinc oxide and zirconium-nickel phosphate was mixed with a small amount of water to form a paste while blending for a period of about 3 minutes. The paste was extruded and subsequently air dried overnight followed by calcination at a temperature of 560° C. for a period of 4 hours to give a final absorption composition having 50 parts by weight zinc oxide and 50 parts by weight zirconium nickel phosphate.

The comparative composition was a mixture of zinc oxide and alumina that was prepared as follows. First, zinc oxide powder was ground to a particle size of less than 200 mesh as defined by American Society for Testing and Materials (ATSM). Next, about 61.2 grams of α-alumina monohydrate were dispersed in 500 milliliters of water with stirring. To the α-alumina monohydrate dispersion, 4.4 milliliter of concentrated nitric acid was added to form an acidic solution comprising alumina. Next, a zinc oxide hydrosol was prepared by slurrying 50.5 grams of the ground zinc oxide powder in 150 milliliter of water. After stirring the acidic solution comprising alumina for about 10 minutes, the zinc oxide hydrosol was added, with rapid stirring, to the acidic solution comprising alumina, and a hydrogel of zinc oxide and alumina was quickly formed. The hydrogel of zinc oxide and alumina was then transferred to an evaporating dish and dried at a temperature of about 120° C. for about 12 hours. The dried hydrogel was then calcined in air at 500° C. for a period of 3 hours. The BET/$N_2$ surface area of the calcined hydrogel was about 60 $M^2$/g. 50 grams of the calcined hydrogel were then impregnated with a solution containing 17.3 grams of $Ni(NO_3)_2 \cdot 6H_2O$ and 33 grams of water. Not all of the solution could be added to the calcined hydrogel, so the partially-impregnated hydrogel was partially dried under a heat lamp before continuing with the impregnation of the rest of the solution. The impregnated hydrogel was then dried for 3 hours at about 110° C., and then calcined at 500° C. for an additional 3 hours to form the comparison composition.

EXAMPLE II

The process of this invention was carried oat using the absorbing compositions produced in Example I.

A reactor was filled with a 5 cc volume bottom layer of inert quartz chips on top of which was placed a 10 cc volume (approximately 10 grams) layer of the particular absorbing composition. The reactor, which was maintained at a pressure of about 1.7 psig, was operated in a fixed bed, downflow mode. Within the reactor, the absorbing composition was heated to the desired operating temperature by an electric furnace. During the heating process, the absorbing composition was maintained under a nitrogen flow. When the desired temperature of about 800° F. to 850° F. was attained, the nitrogen flow was stopped, and a simulated sulfur plant gas and, when used, water vapor flows were started. The water vapor was generated by pumping water through a heated line that was connected to the top of the reactor. The reaction was carried out at a reaction temperature in the range of from about 800° F. to 850° F. and a gas hourly space velocity of 2500 cc/ec absorbent/hour. The composition of the simulated sulfur plant gas was as follows: 1.4 volume percent hydrogen sulfide, 13.3 volume percent carbon dioxide, and 85.3 volume percent nitrogen or 1.4 volume percent hydrogen sulfide and 98.6 volume percent nitrogen.

The absorbing composition was used in a cyclic manner. A complete process cycle consists of a contacting step whereby an $H_2S$ containing stream is brought into contact with the absorption composition and in which chemi-absorption takes place and a regeneration step. Once the chemi-absorption reaction is complete, as can sometimes be evidenced by an increase in the amount of $H_2S$ that breaks through the bed of absorbing composition, the fluid stream being treated is discontinued and the absorbing composition is regenerated by passing a gas containing free oxygen in contact with the absorption composition. The oxygen contained in the regeneration gas serves to convert the absorbed sulfur to an oxide compound, and to drive from the absorption material the absorbed sulfur in the form of SOx.

The progress of the absorption was followed by measuring the concentration of hydrogen sulfide in the reactor effluent after the water vapor had been condensed and removed from the effluent. The concentration of hydrogen sulfide or sulfur dioxide, or both, was measured with commercially available Draeger tubes that were suited to the concentration ranges encountered and in accordance with the manufacturer's recommendations.

Once each absorbing composition became fully sulfided, as evidenced by hydrogen sulfide breakthrough, the flow of the simulated sulfur plant gas to the reactor was halted, and the reactor was purged with nitrogen for a period of 20 minutes while being heated to a regeneration temperature of about 1170° F. The sulfided absorbing composition was then regenerated in the presence of air for about 1.5 hours. Following regeneration, the reactor was again purged with nitrogen for 40 minutes while being cooled back down to the reaction temperature in the range of about 800° F. to about 850° F. The nitrogen purge was then halted and the simulated sulfur plant gas was fed to the reactor to begin another absorption cycle.

This example illustrates the use of the, absorbing composition prepared in the manner described in Example for the removal of $H_2S$ from a simulated sulfur plant gas stream. The results are presented as a function of the amount of sulfur dioxide present in the treated effluent gaseous stream (measured in ppm) at the time of the reading. The sulfur loading is the weight percent of sulfur present on the absorption material at the time when hydrogen sulfide breaks through the absorbent bed. This is essentially the absorption capacity of the absorbent material. The test results are summarized in Table I.

TABLE I

| Composition | $SO_2$ Level at 10 minutes (ppm) | Sulfur Loading at $H_2S$ Breakthrough (%) |
|---|---|---|
| A (zinc oxide/titanium phosphate) | 480–600 | 15 |
| B (zinc oxide/aluminum phosphate) nickel promoted | 300–400 1180 | 10 8 |
| C (zinc oxide/magnesium phosphate) | 130 | 9 |
| D (zinc oxide/titanium-aluminum phosphate) | 420 | 11 |
| E (zinc oxide/zirconium-aluminum phosphate) | 600 | 8 |
| F (zinc oxide/titanium-nickel phosphate) | 480 | 10 |
| G (zinc oxide/zirconium-nickel phosphate) | 400 | 6 |

TABLE I-continued

| Composition | SO$_2$ Level at 10 minutes (ppm) | Sulfur Loading at H$_2$S Breakthrough (%) |
|---|---|---|
| comparison (zinc oxide/alumina) | 1680–1800 | 10 |

The data present in Table I show the improvement in absorption performance which will result from utilizing the novel compositions as herein described. Table I shows that the novel absorption mixtures significantly and materially reduce the amount of sulfur slippage, which is the amount of hydrogen sulfide that is oxidized to sulfur dioxide during the absorption cycle, over that of the comparative composition. Furthermore, a comparison of the sulfur loadings set forth in Table I shows that the inventive compositions employed in the process of the present invention have a dramatically improved sulfur loading capacity. The data presented clearly establishes the improvements over the prior art that are achievable using the novel composition in the inventive process.

Reasonable variation and modifications are possible within the scope of this disclosure without departing from the scope and spirit thereof.

That which is claimed is:

1. A process for the removal of sulfur compounds from a fluid stream comprising contacting said fluid stream under suitable adsorption conditions with the composition comprising zinc oxide and at least one metal phosphate.

2. A process as recited in claim 1 wherein said at least one metal phosphate is selected from the group consisting of Group IIA phosphates, Group IVB phosphates, Groups IIIA phosphates and Group VIII phosphates.

3. A process as recited in claim 1 wherein said at least one metal phosphate is selected from the group consisting of titanium phosphate, magnesium phosphate and aluminum phosphate.

4. A process as recited in claim 1 wherein said zinc oxide is present in the range of from about 65 parts by weight of the total combined weight of the zinc oxide and at least one metal phosphate to about 95 parts by weight of the total combined weight of the zinc oxide and the at least one metal phosphate.

5. A process for the removal of sulfur compounds from a fluid stream comprising contacting said fluid stream under suitable adsorption conditions with a composition comprising zinc oxide and a coprecipitate of two or more metal phosphates.

6. A process as recited in claim 5 wherein said coprecipitate is of a Group IVB phosphate and a metal phosphate selected from the group consisting of Group IIIA phosphates and Group VIII phosphates.

7. A process as recited in claim 6 wherein the weight ratio of said coprecipitate of a Group IVB phosphate and a metal phosphate selected from the Group consisting of Group IIIA phosphates and Group VIII phosphates is in the range of from about 1 to 10 to about 10 to 1.

8. A process as recited in claim 7 wherein said zinc oxide is present in the range of from about 65 parts by weight of the total combined weight of said zinc oxide and said coprecipitate to about 95 parts by weight of the total combined weight of said zinc oxide and said coprecipitate.

9. A process as recited in claim 5 wherein said coprecipitate is of a metal phosphate selected from the group consisting of titanium phosphates and zirconium phosphates and a metal phosphate selected from the group consisting of nickel phosphates and aluminum phosphates.

10. A process for the removal of sulfur compounds from a fluid stream comprising contacting said fluid stream under suitable adsorption conditions with a composition prepared by mixing zinc oxide and at least one metal phosphate, and adding to the thus formed mixture a suitable amount of suitable acid to form a paste having a desired consistency.

11. A process as recited in claim 10 wherein the composition is further prepared by agglomerating said paste to form an agglomerate, drying said agglomerate, and calcining said agglomerate.

12. A process as recited in claim 11 wherein said agglomerating step is performed by extrusion means, said drying step is performed prior to said calcining step and at a drying temperature in the range from about 25° C. to about 100° C. for a time period ranging upwardly to about 24 hours, and said calcining step is performed at a temperature in the range of from about 400° C. to about 600° C. for a time period ranging upwardly to about 6 hours.

13. A process as recited in claim 12 wherein said suitable absorbing conditions comprise a temperature in the range of from about 150° C. to about 600° C., a total system pressure in the range of from about atmospheric to about 2000 psig, and a residence time for said fluid stream in the presence of said composition in the range of from about 10 to about 10,000 volumes of gas at standard temperature and pressure per volume of said absorbing composition per hour.

14. A process for the adsorption of sulfur compounds from a fluid stream comprising:
contacting said fluid stream with the composition prepared by the method comprising mixing zinc oxide and at least one metal phosphate, and adding to the thus formed mixture a suitable amount of suitable acid to form a paste having a desired consistency.

15. A process as recited in claim 14 wherein the composition is further prepared by agglomerating said paste to form an agglomerate, drying said agglomerate, and calcining said agglomerate.

16. A process as recited in claim 15 wherein said agglomerating step is performed by extrusion means, said drying step is performed prior to said calcining step and at a drying temperature in the range from about 25° C. to about 100° C. for a time period ranging upwardly to about 24 hours, and said calcining step is performed at a temperature in the range of from about 400° C. to about 600° C. for a time period ranging upwardly to about 6 hours.

17. A process for the adsorption of sulfur compounds from a fluid stream comprising:
contacting said fluid stream with the composition prepared by the method comprising coprecipitating a Group IVB phosphate and a metal phosphate selected from the group consisting of Group IIIA phosphates and Group VIII phosphates to form a coprecipitate of said Group IVB phosphate and said metal phosphate, mixing said coprecipitate with zinc oxide to form a mixture of said coprecipitate and said zinc oxide, and adding to said mixture a suitable amount of diluted concentrated nitric acid to form a paste having a desired consistency.

* * * * *